UNITED STATES PATENT OFFICE.

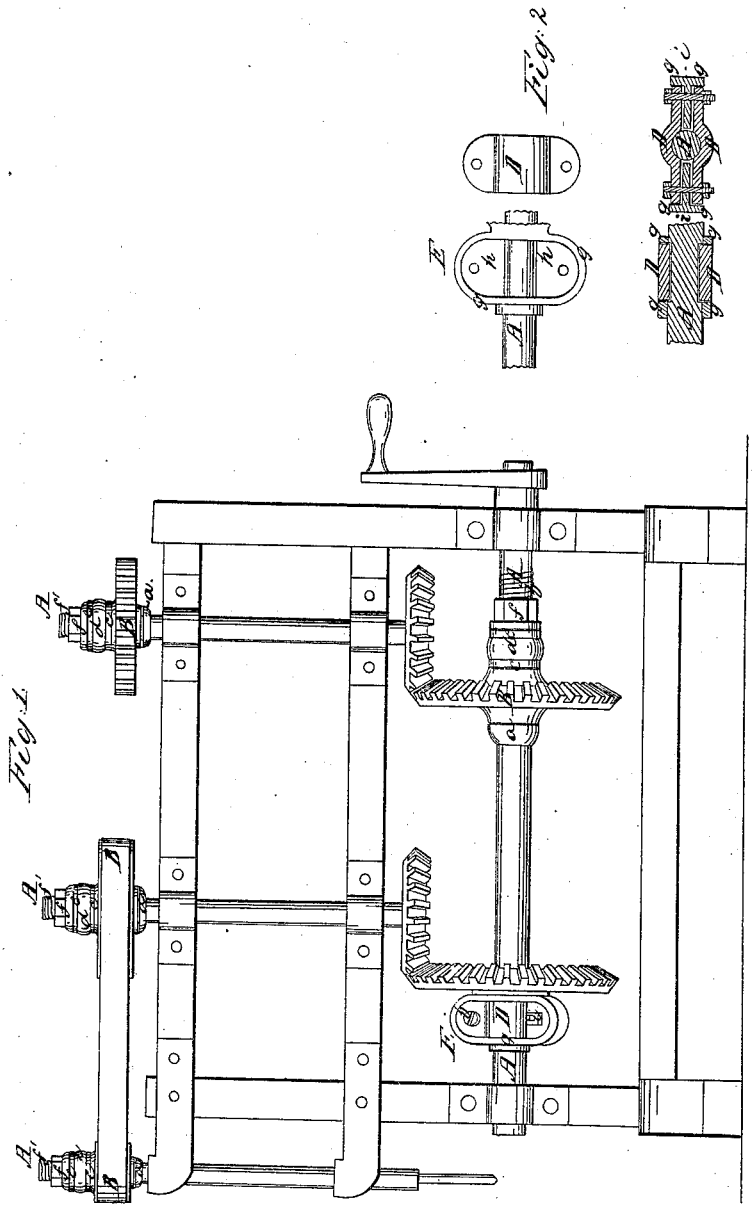

RICHARD J. GATLING, OF INDIANAPOLIS, INDIANA.

IMPROVEMENT IN MACHINE-GEARING.

Specification forming part of Letters Patent No. 30,059, dated September 18, 1860.

*To all whom it may concern:*

Be it known that I, RICHARD J. GATLING, of Indianapolis, in the county of Marion and State of Indiana, have invented a new and useful Improvement in Machine-Gearing; and I do hereby declare that the following is a full, clear, and exact description thereof, reference being had to the accompanying drawings, making part of this specification, in which—

Figure 1 is a side view of a frame furnished with several wheels and pulleys that are attached to their respective shafts by means of my improvement. Fig. 2 is a detail view of a modification of my improvement as seen at E, Fig. 1.

Similar letters of reference indicate corresponding parts in the two figures.

The object of this invention is to provide a suitable means of securing wheels and pulleys to shafting, whereby they are held with sufficient firmness to drive the machinery connected therewith; but in the event that any extra strain or unyielding obstruction should be encountered they will slip on their seats while the obstruction remains, allowing the shafts to continue their motion, and thus prevent injury to the cogs of wheels and other parts of the machinery to which it is applied.

To enable others skilled in the art to make and use my invention, I will proceed to describe it.

One end of the hub of the wheels and pulleys (lettered B) rests against the shoulder or fixed collar $a$ of the shaft A. Against the opposite end of the hub is a loose washer $c$, and against the loose washer $c$ an india-rubber spring $d$, and against the india-rubber spring $d$ another loose washer $e$, and against the last-named washer a female screw $f$, working on a male screw $f'$, cut on the shaft A. Now by turning the female screw $f$ toward the wheel or pulley B the india-rubber spring $d$ will be compressed against the loose washer $c$, which will be forced against the hub of the wheel or pulley, and thereby prevent it from slipping or turning on its seat while doing its legitimate work; but in the event that any unyielding obstruction is encountered by the machinery driven by the wheel or pulley thus secured to the shaft, and which would be liable to strain or injure it if the wheel or pulley were rigidly fixed to the shaft, the compressed india-rubber spring allows the wheel or pulley to yield to the unusual strain and slip on its seat, while the shaft to which it is secured may continue to rotate without injury to the connected machinery.

The advantages of this manner of securing wheels and pulleys on and to shafting are very manifest. For instance, in the use of metal drills for drilling holes in iron, in case the drill-point comes in contact with a hard spot in the metal that would break it, or becomes "choked," (as often occurs when the drill is driven by the ordinary gearing,) this arrangement for allowing the pulley and shaft which drives the drill to remain stationary while the other parts of the gearing keep in motion will prevent the points of the drill from being broken off in the holes being drilled, which drill-points, when so broken, prove very troublesome and difficult to remove from their place of lodgment. So, also, my plan of attaching drums and pulleys on and to shafting will be the means of preventing bands which work on the same being thrown off such drums and pulleys, for the reason as before stated. This mode of securing the drums and pulleys on the shafts allows them to stop, while the shaft on which such drum or pulley is attached will continue to rotate, and the other parts of the machinery to go on without hinderance, loss of time, or injury to any part of the machinery.

The value of this manner of attaching cog-wheels or pulleys on and to shafting may be also seen in its utility when applied to costly slide-lathes for turning iron, where many of the cog-wheels are necessarily delicate and easily broken. Such lathes are now used without any means of saving the gearing from injury, and often a part of the gearing is broken in consequence of the chisel or tool of the lathe coming in contact with a shoulder or hard spot on or in the metal being worked. My invention entirely prevents such accidents or injury.

My particular mode and manner of attaching cog-wheels and pulleys on and to shafting also allows such bodies being retained and secured in and to their proper places and positions on the shafting, so as to always be secure and hold the same in their proper and legitimate positions; in other words, squarely and truly on their seats. Moreover, this relief-gearing, as particularly described, will not only save breakage of machinery and time to the operator in replacing bands on pulleys, &c., but will also be the means of the bands and cog-wheels wearing much longer and more evenly than is attainable by ordinary gearing.

At E, Fig. 1, is seen a modification of my improvement in machine-gearing, and which is shown clearly in detail in Fig. 2. One hub of the wheel or pulley is enlarged and forms a kind of box, somewhat like an ordinary journal-box, having two caps so arranged as to be compressed upon the shaft by screw-bolts, which hold the wheel or pulley upon its seat and prevent its rotating on the shaft.

E, Fig. 2, is the enlarged hub, having the cap D removed to show the internal relation of the hub to the shaft. The flanges $g$ form recesses or cavities on opposite sides of the hub, into which the caps D are snugly fitted, and which serve to keep them in their proper positions. The partitions $h\ h$ serve to strengthen the hub, and also to steady the bolts $i\ i$. A bearing is turned on the shaft in which the caps D rest, and which prevents the wheel or pulley from moving sidewise. The spaces left between the caps D and the partitions $h\ h$ admit of the caps being compressed upon the shaft with any desired force.

Having thus fully described the construction and operation of my improvement, what I claim as new, and desire to secure by Letters Patent, is—

1. The arrangement of the fixed collar $a$, loose washer $c$, india-rubber spring $d$, loose washer $e$ with the female screw $f$, and the male screw $f'$, when used, in combination with the cog-wheel or pulley, as described and operated for the purpose set forth.

2. The enlarged hub or appendage E of and to the wheel or pulley, with the recess or cavity formed by the flanges $g$ in the same for receiving the caps D, when constructed and arranged as described, and operated for the purpose set forth.

RICHARD J. GATLING.

Witnesses:
O. F. MAYHEW,
W. R. STRANGE.